United States Patent
Lorente et al.

(10) Patent No.: US 8,114,278 B2
(45) Date of Patent: Feb. 14, 2012

(54) FUEL FILTER

(75) Inventors: Sonia Lorente, Zaragoza (ES); Michael Wolf, Neunkirchen (DE); Günter Jokschas, Murrhardt (DE); Horst Croissant, Hochstadt (DE)

(73) Assignee: Mann & Hummel GmbH, Ludwigsburg (DE)

( * ) Notice: Subject to any disclaimer, the term of this patent is extended or adjusted under 35 U.S.C. 154(b) by 207 days.

(21) Appl. No.: 12/522,495

(22) PCT Filed: Jan. 11, 2008

(86) PCT No.: PCT/EP2008/050295
§ 371 (c)(1),
(2), (4) Date: Jan. 18, 2010

(87) PCT Pub. No.: WO2008/084098
PCT Pub. Date: Jul. 17, 2008

(65) Prior Publication Data
US 2010/0126920 A1    May 27, 2010

(30) Foreign Application Priority Data
Jan. 12, 2007    (DE) .................. 20 2007 000 746 U

(51) Int. Cl.
*B01D 17/02* (2006.01)
(52) U.S. Cl. ............. 210/188; 210/433.1; 210/434; 210/484; 210/337; 210/DIG. 17
(58) Field of Classification Search .............. None
See application file for complete search history.

(56) References Cited

U.S. PATENT DOCUMENTS

| | | | | |
|---|---|---|---|---|
| 2,617,535 A | * | 11/1952 | Hamilton | 210/132 |
| 2,942,732 A | * | 6/1960 | Edelen | 210/436 |
| 3,283,902 A | * | 11/1966 | Silverwater et al. | 210/90 |
| 3,297,162 A | * | 1/1967 | Mouwen | 210/132 |
| 4,557,829 A | * | 12/1985 | Fields | 210/132 |
| 5,053,129 A | * | 10/1991 | Kitson | 210/232 |
| 5,084,170 A | * | 1/1992 | Janik et al. | 210/232 |
| 5,096,581 A | * | 3/1992 | Purvey | 210/232 |
| 5,110,460 A | * | 5/1992 | Gilas | 210/149 |
| 5,279,733 A | * | 1/1994 | Heymans | 210/232 |

(Continued)

FOREIGN PATENT DOCUMENTS
DE     19835525 C1     10/1999

(Continued)

OTHER PUBLICATIONS

DPMA (German patent office) search report for related DE 20 2007 000 746.9. English abstract of JP2006046142A.

(Continued)

*Primary Examiner* — Robert James Popovics
(74) *Attorney, Agent, or Firm* — James Hasselbeck

(57) ABSTRACT

The invention concerns a fuel filter 10, in particular for diesel fuels, that comprises a housing 11 and a filter medium 12. The filter medium 12 is arranged by means of a filter medium holder 24 in the housing, wherein the filter medium holder comprises a venting bore 25. Through the venting bore 25 gases that collect in the upper area of the fuel filter can pass from the crude chamber 21 into the clean chamber 22. For avoiding that contaminants can escape through a clean outlet 18 from the fuel filter 10 and damage components downstream, a clean medium 26 is provided that retains such contaminants.

6 Claims, 2 Drawing Sheets

U.S. PATENT DOCUMENTS

| | | | | |
|---|---|---|---|---|
| 5,413,711 A * | 5/1995 | Janik | | 210/300 |
| 5,456,828 A * | 10/1995 | Tersi et al. | | 210/184 |
| 5,484,539 A * | 1/1996 | Tersi et al. | | 210/774 |
| 5,489,384 A * | 2/1996 | Janik et al. | | 210/436 |
| 5,525,225 A * | 6/1996 | Janik et al. | | 210/436 |
| 6,533,932 B1 * | 3/2003 | Kallberg et al. | | 210/232 |
| 6,540,926 B2 * | 4/2003 | Goodrich | | 210/801 |
| 6,627,079 B2 * | 9/2003 | Koivula | | 210/248 |
| 6,641,742 B2 * | 11/2003 | Prater et al. | | 210/767 |
| 6,758,980 B2 * | 7/2004 | Prater et al. | | 210/767 |
| 6,881,328 B2 * | 4/2005 | Dittmann et al. | | 210/86 |
| 6,881,330 B2 * | 4/2005 | Doyle et al. | | 210/132 |
| 6,994,784 B2 * | 2/2006 | Jainek | | 210/149 |
| 7,014,766 B2 * | 3/2006 | Mack et al. | | 210/416.4 |
| 7,048,848 B2 * | 5/2006 | Assion | | 210/117 |
| 7,232,521 B2 * | 6/2007 | Merritt et al. | | 210/206 |
| 7,299,931 B2 * | 11/2007 | Schachtrup et al. | | 210/436 |
| 7,395,936 B2 * | 7/2008 | Knight | | 210/436 |
| 7,396,473 B1 * | 7/2008 | Guynn | | 210/774 |
| 7,479,219 B2 * | 1/2009 | Rassinger | | 210/130 |
| 7,641,804 B2 * | 1/2010 | Thalmann et al. | | 210/767 |
| 7,998,353 B2 * | 8/2011 | Vandendijk et al. | | 210/767 |
| 2001/0042725 A1 * | 11/2001 | Goodrich | | 210/801 |
| 2002/0020681 A1 * | 2/2002 | Koivula | | 210/798 |
| 2003/0102268 A1 * | 6/2003 | Prater et al. | | 210/741 |
| 2003/0178351 A1 * | 9/2003 | Doyle et al. | | 210/131 |
| 2004/0094459 A1 * | 5/2004 | Prater et al. | | 210/90 |
| 2004/0099587 A1 * | 5/2004 | Schachtrup et al. | | 210/115 |
| 2004/0206691 A1 * | 10/2004 | Charin et al. | | 210/493.1 |
| 2004/0211720 A1 * | 10/2004 | Mack et al. | | 210/416.4 |
| 2006/0027510 A1 * | 2/2006 | Rassinger | | 210/790 |
| 2008/0060991 A1 * | 3/2008 | Gaither | | 210/424 |
| 2009/0114589 A1 * | 5/2009 | Reiland et al. | | 210/472 |
| 2009/0261029 A1 * | 10/2009 | Fisher | | 210/232 |
| 2009/0283481 A1 * | 11/2009 | Vandendijk et al. | | 210/767 |
| 2010/0126920 A1 * | 5/2010 | Lorente et al. | | 210/188 |

FOREIGN PATENT DOCUMENTS

| | | |
|---|---|---|
| DE | 20116185 U1 | 3/2003 |
| JP | 2006046142 A | 2/2006 |
| WO | WO2007/010037 A | 1/2007 |

OTHER PUBLICATIONS

Search report of PCT/EP2008/050295.

* cited by examiner

FUEL FILTER

CROSS REFERENCE TO RELATED APPLICATIONS

This application is U.S. National Stage Entry of international patent application No. PCT/EP2008/050295, filed Jan. 11, 2008, designating the United States of America, the entire disclosure of which is incorporated herein by reference. Priority is claimed based on Federal Republic of Germany patent application no. 202007000746.9, filed Jan. 12, 2007, the entire disclosure of which is incorporated herein by reference.

TECHNICAL FIELD

The invention concerns a fuel filter according to the preamble of claim 1.

PRIOR ART

Fuel filters are known that comprise a housing and a filter medium. The housing comprises an inlet and an outlet wherein the filter medium is arranged between the inlet and the outlet. In fuel filters that operate by suction, i.e., with a pump arranged in the flow direction downstream of the fuel filter, fuel outgasses at the crude side of the filter medium. The gas bubbles collect at the crude side in an upper area of the fuel filter within the housing. For preventing that more and more gases collected in the interior of the housing, venting bores are provided that connect the crude side with the clean side downstream of the filter medium. The gases that are contained at the crude side can thus pass to the clean side. A disadvantage of this configuration is however that through the venting bores also dirt particles can pass from the crude side to the clean side and can damage components arranged downstream.

It is an object of the invention to provide a fuel filter that can be operated in suction operation and that prevents too great a gas collection in the housing. At the same time, it is to be prevented that the coarse dirt particles reach the components arranged downstream. This object is solved by the features of claim 1.

SUMMARY OF THE INVENTION

The fuel filter according to the invention comprises a housing with an inlet and an outlet. For cleaning the fuel a filter medium is provided that retains the contaminants contained in the fuel. In this connection, the filter medium is substantially impermeable for gases and/or water contained in the fuel. Such filter media can be comprised of any material. Preferably, single layer or multilayer cellulose-containing filter media or synthetic non-wovens are employable. The housing can be of a single-part or multi-part configuration and can be comprised of metal or synthetic material. In the housing, between the inlet and the filter medium a crude side for the fuel to be filtered is formed. Between the outlet and the filter medium a clean side is arranged that contains the filtered fuel. Between the crude side and the clean side a venting device is provided that is suitable for transporting gases from the crude side to the clean side. The venting device can be designed, for example, in the form of small bores or slots that are arranged in the upper area of the filter. The venting device can be integrated also in the upper area into the filter medium. In other configurations, a separate component can be provided that communicates with the crude side as well as with the clean side. The venting device has openings that are greater than the pores of the filter medium. In this way, gas bubbles that are prevented by the filter medium from passing to the crude side can reach the clean side through the venting device. Between the outlet and the venting device an additional fine medium is arranged which is suitable for separation of contaminants that are obtained at the clean side. In this connection, the fine medium is designed such that contaminants that can cause damage in components arranged downstream can be retained by the fine medium. The gas bubbles that are contained in the fuel can however can pass though the fine medium. The fine medium, for example, can be designed as a screen with a mesh width of approximately 50 to 100:m. Preferably, the screen fineness is approximately 60:m.

According to a further embodiment of the invention, the venting device has a coarse separator. Such a coarse separator can be e.g. also embodied as a screen wherein the fineness of the coarse separator>100:m. Accordingly, very coarse particles are prevented from passing from the crude side to the clean side.

In an advantageous embodiment of the invention the venting device is integrated into a filter medium holder. The filter medium holder, on the one hand, is seal tightly connected to the filter medium, for example, by gluing or welding. Furthermore, the filter medium holder is seal-tightly connected to the housing. The connection can be realized directly with a housing part or by other functional parts. In this arrangement, the venting device is above the filter medium, so that the venting device is arranged in the gas collecting area of the housing and ensures a reliable venting action of the crude side.

In advantageous embodiments the filter medium is embodied as a screen fabric. Individual fibers can be interwoven for this purpose. In other embodiments, the fine medium can also be produced in a molding process and can be provided with uniform pores or openings. These openings are in a preferred range of approximately 50-100:m.

According to a further embodiment of the invention the fine medium is connected to a support cage wherein the support cage is connectable to the housing. By using a fuel-permeable support cage too great a mechanical loading of the fine medium that can cause damage is prevented. The support cage itself has such large openings that they cannot perform any separating function and therefore cannot negatively affect the flow resistance.

According to an advantageous embodiment of the invention the support cage is formed of a thermoplastic synthetic material that is non-detachably connected to the fine medium. The non-detachable connection can be produced for example by gluing. A support cage of thermoplastic material can be produced in a simply and inexpensive way by a molding process.

In an advantageous embodiment of the support cage is welded to the fine medium so that the fine medium cannot accidentally detach from the support cage and a reliable connection is formed without additional material.

In an alternative embodiment the support cage can also be injection-molded directly onto the fine medium. For this purpose, the fine medium is inserted into an injection molding machine and the support cage is directly formed on the fine medium. The melt of the support cage penetrates into the pores of the fine medium and forms thus after solidification a non-detachable fixed connection with the support geometries. The fine medium with the support cage can be produced in this way by a single process step.

According to an advantageous embodiment of the invention the housing has a cup and a lid wherein the cup is connected by a seal holder to the lid, in particular by crimping. According to this embodiment the fuel filter is embodied as a replacement filter which is easily exchangeable as a unit. The cup can be produced as a deep-drawn part from thin sheet metal. The lid is designed as a stable metal plate with openings wherein the lid is crimped by means of a seal holder with the cup. In this connection, the seal holder is also formed of thin sheet metal.

BRIEF DESCRIPTION OF THE DRAWINGS

Further details of the invention will be explained in the following with the aid of the embodiment. It is shown in.

EMBODIMENT(S) OF THE INVENTION

Figure 1:
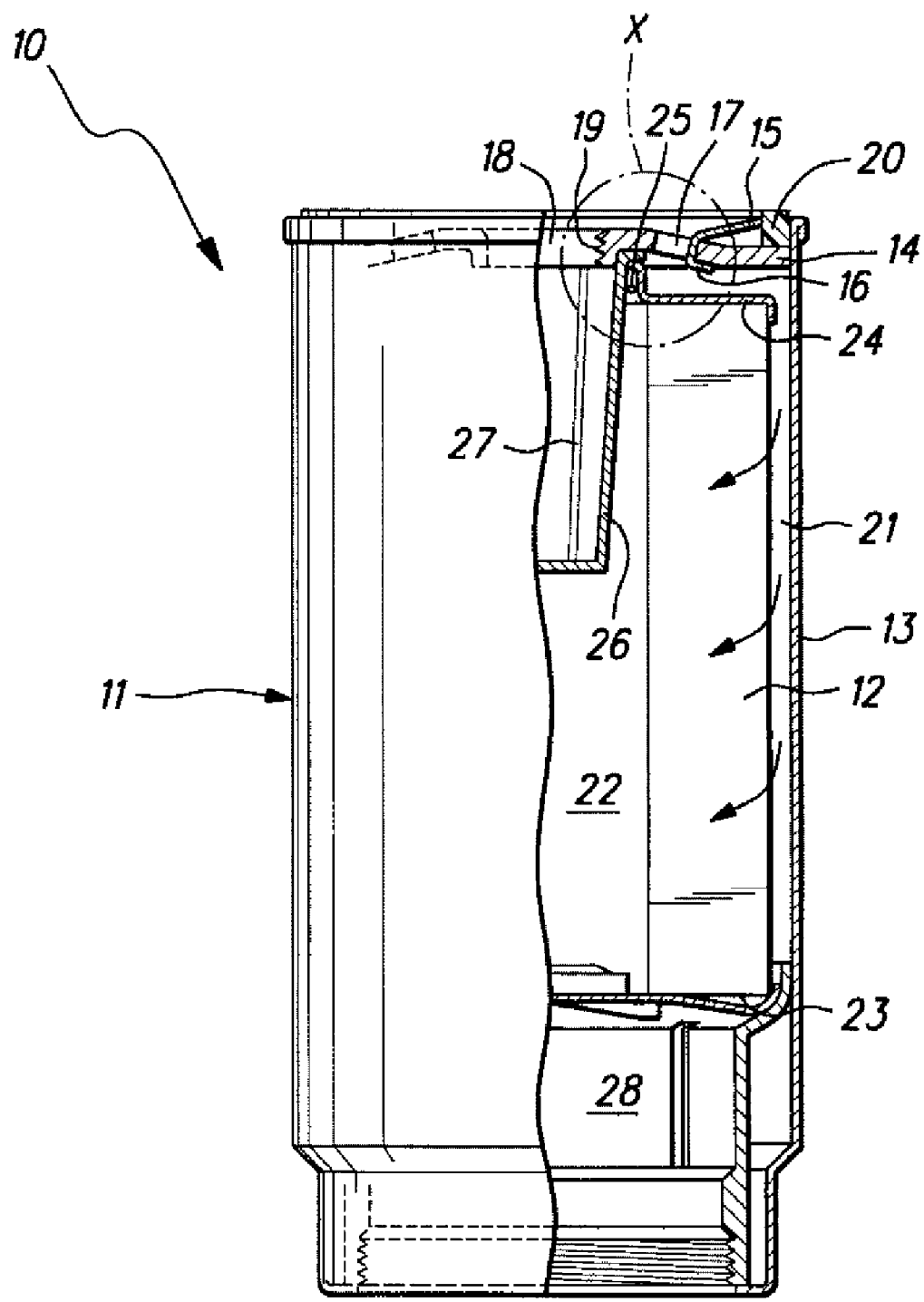
FIG. 1 a fuel filter, one half shown in a section view.

FIG. 1 shows a fuel filter 10, one half illustrated in a section view. The fuel filter 10 comprises a housing 11 and a filter medium 12. The housing 11 is formed by a cup 13 and a lid 14. The lid 14 is connected by means of a seal holder 15 to the cup 13. This connection is formed by crimping the seal holder 15 to the cup 13. For fixation of the lid 14 tabs 16 of the seal holder 15 engage inlet openings 17 of the lid 14. The lid 14 has several distributed inlet openings 17 through which the fuel to be purified flows into the housing 11. Moreover, the lid 14 has a centrally arranged outlet opening 18. The outlet opening 18 has a thread 19 with which the fuel filter 10 can be screwed onto a flange (not illustrated). For a seal-tight connection of the fuel filter 10 on the flange a seal 20 is provided that is compressed between the flange and the housing 11 of the fuel filter 10.

In the interior of the housing 11 the filter medium 12 is arranged such that between the inlet openings 17 and the filter medium 12 a crude chamber 21 is formed. In the interior of the star-shaped folded and annularly closed filter medium 12 there is a clean chamber 22. For separating the crude chamber 21 from the clean chamber 22 the filter medium 12 is seal-tightly connected with its lower end face to a terminal disk 23. In this connection, the terminal disk 23 is configured as a closed component. In the upper end face area of the filter medium 12 the filter medium is seal-tightly connected to a filter medium holder 24. This connection can be produced by means of an adhesive in a simple and inexpensive way. The filter medium holder 24 has venting bores 25 that are arranged in the area of the filter medium holder 24 that is above the filter medium 12. Between the venting bores 25 and the outlet opening 18 a fine medium 26 arranged. The fine medium 26 is embodied as a plastic diaphragm with a pore size of approximately 60:m. On the outflow side of the fine medium 26 there is a support cage 27 that serves as a mechanical stabilization of the fine medium 26. For this purpose, the support cage 27 has longitudinal ribs. As an alternative, or in addition, to the longitudinal ribs there can also be transverse ribs.

The fuel filter 10 according to this embodiment is a fuel prefilter wherein water contained in the fuel is separated by the filter medium 12. The water sinks in the fuel filter 10 downwardly and collects within the water collecting chamber 28 from where it can be drained from the fuel filter 10.

The fuel to be filtered flows through the inlet openings 17 into the crude chamber 21 of the fuel filter 10. The contaminants contained in the fuel such as particles, water droplets or gas bubbles are retained by the filter medium 12 and thus cannot reach the clean chamber 22. The separated water droplets collect in the water collecting chamber 28 that is arranged below the filter medium 12. The gas bubbles rise and collect in the upper area above the filter medium 12. The fuel passes in the direction of the arrow through the filter medium 12 and thus reaches the clean chamber 22. The gas bubbles that have collected in the upper area of the fuel filter 10 pass through the venting bores 25 from the crude chamber 21 to the clean chamber 22. The purified fuel and the gas bubbles penetrate the fine medium 26 and can exit the fuel filter 10 through the outlet opening 18.

Figure 2:
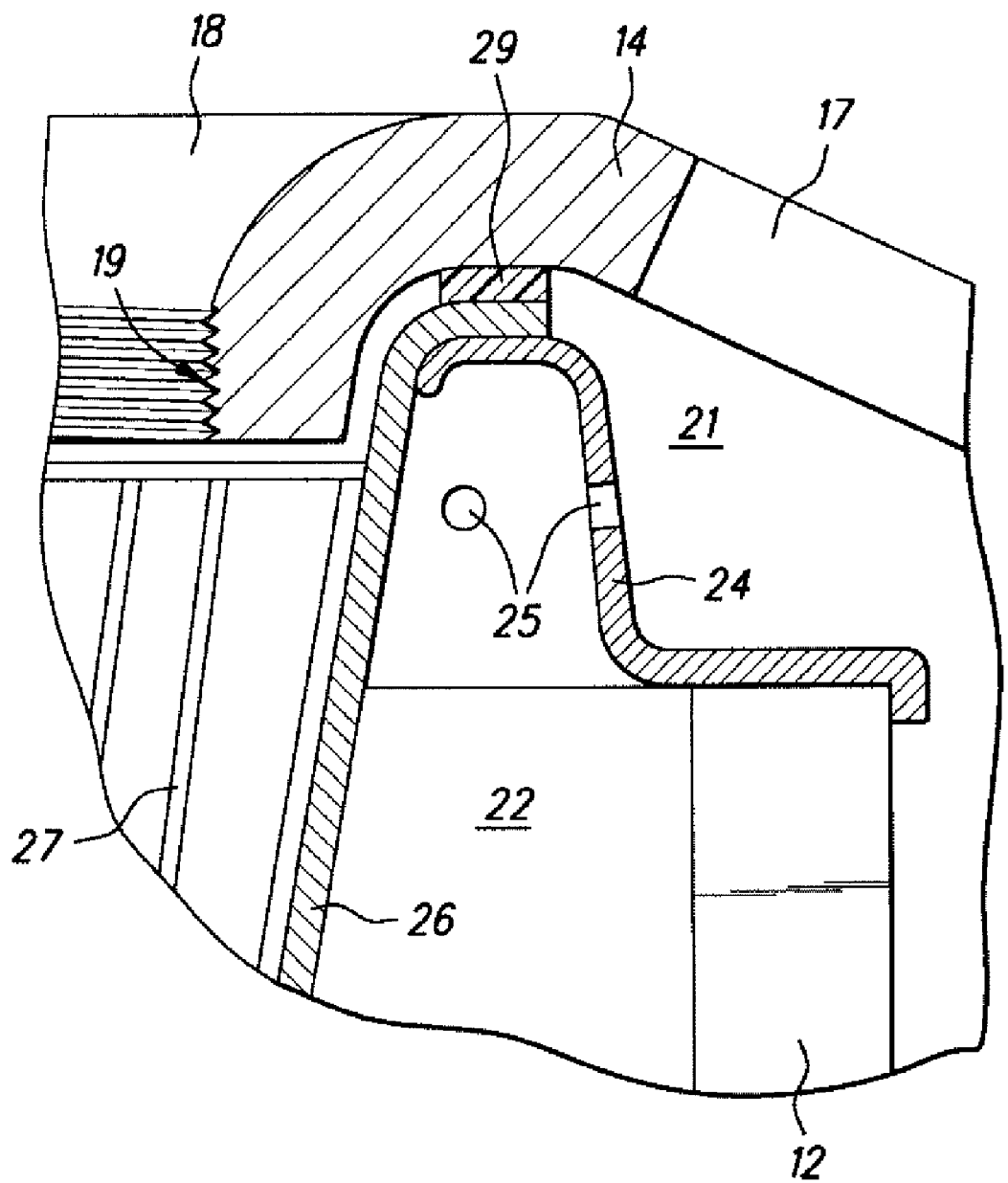
FIG. 2 a detail X according to FIG. 1.

In FIG. 2 a detail X is illustrated at an enlarged scale. Same components are identified with same reference numerals. The upper area of the filter medium holder 24 adjoins seal-tightly the fine medium 26. The fine medium 26 is seal-tightly compressed with a flat seal 29 against the lid 14 so that leakage is prevented.

The invention claimed is:

1. A fuel filter for diesel fuels, comprising:
a housing (11); and
a filter medium (12);
wherein the housing (11) comprises:
at least one inlet (17)
a cup (13) and a lid (14), wherein the cup (13) is connected by a seal holder (15) to the lid (14) by crimping;
an outlet (18),
a crude side (21) is defined between the inlet (17) and the filter medium (12);
a clean side (22) is defined between the outlet (18) and the filter medium (12); and
a venting device (25) is provided between the crude side (21) and the clean side (22) which is capable of transporting gases from the crude side (21) to the clean side (22), wherein the venting device (25) has a coarse separator integrated into a filter medium holder (24);
characterized in that between the outlet (18) and the venting device (25) an additional fine medium (26) is connected to a support cage (27), the support cage (27) connected to the housing (11), said fine medium (26) being capable of separating contaminants contained in the clean side (22), as fluid flows from the clean side to the outlet (18).

2. A fuel filter according to claim 1, wherein the fine medium (26) is a screen fabric.

3. A fuel filter according to claim 1, wherein the support cage (27) is formed of a thermoplastic synthetic plastic material and is non-detachably connected to the fine medium (26).

4. A fuel filter according to claim 3, wherein the fine medium (26) is comprised of a thermoplastic synthetic material and is welded to the support cage (27).

5. A fuel filter according to claim 3, wherein the support cage (27) is injection molded onto the fine medium (26).

6. A fuel filter according to claim 3, wherein said
support cage (27) is conically shaped, axially aligned with and closes over said outlet (18);
wherein said support cage (27) is positioned supportively against an outlet (18) facing side of said fine medium (26); and
wherein said fuel filter further comprises a water collecting chamber (28) positioned to be operable to collect water removed from the fuel by said filter medium (12).

* * * * *